3,322,821
PROCESS FOR CONVERTING [4-[2-(ORGANOSULFINYLMETHYL)ALKANOYL]PHENOXY]ALKANOIC ACIDS AND [4-[2-(ORGANOSULFONYLMETHYL)ALKANOYL]PHENOXY]ALKANOIC ACIDS TO THEIR [4-(2-METHYLENEALKANOYL)PHENOXY]ALKANOIC ACID DERIVATIVES

Edward J. Cragoe, Jr., Lansdale, Pa., assignor to Merck & Co., Inc., Rahway, N.J., a corporation of New Jersey
No Drawing. Filed Dec. 23, 1963, Ser. No. 332,905
20 Claims. (Cl. 260—520)

This invention relates to a new method for preparing [4-(2-alkyleneacyl)phenoxy]alkanoic acids, compounds which possess diuretic, natriuretic and chloruretic properties.

Pharmacological studies of the products of this invention demonstrate that they possess the unique property among diuretic agents in that they can cause more electrolyte to be excreted than can be caused to be excreted by known diuretic agents. Thus, while most known diuretics reach a threshold or ceiling in the amount of electrolyte they can cause to be excreted, the compounds of this invention can bring about the excretion of from 2 to 5 or more times this ceiling value.

Broadly stated, the invention comprises a process for the introduction of an α,β-olefinic linkage in the acyl moiety of an (acylphenoxy)alkanoic acid. More specifically the invention relates to a process for the conversion of a [4-[2-(organosulfinylmethyl)alkanoyl]phenoxy]alkanoic acid or a [4-[2-(organosulfonylmethyl)alkanoyl]phenoxy]alkanoic acid to the corresponding [4-(2-methylenealkanoyl)phenoxy]acetic acid. The following equation illustrates the process:

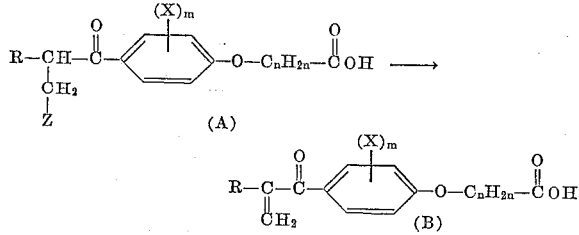

where R is a member selected from the group consisting of lower alkyl, e.g., methyl, ethyl, propyl, isopropyl, butyl, pentyl, etc., halo-lower alkyl, e.g., trihalomethyl-lower alkyl, such as 2,2,2-trifluoroethyl, 1-(trifluoromethyl)ethyl, etc., cycloalkyl containing 3 to 6 nuclear carbon atoms, e.g., cyclopropyl, cyclopentyl, cyclohexyl, etc.,

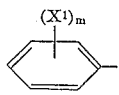

wherein $X^1$ represents a member selected from the group consisting of hydrogen, halogen, lower alkyl, lower alkoxy, carboxy and lower alkylsulfonyl, e.g., mesyl, and

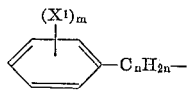

wherein $X^1$ is as defined above, X is a member selected from the group consisting of hydrogen, halogen, trifluoromethyl, lower alkyl, nitro and lower alkoxy and, when substituted on adjacent carbon atoms of the benzene ring, two X radicals may be combined to form a 1,3-butadienylene chain (i.e., —CH=CH—CH=CH—), Z is a member selected from the group consisting of —SO—$R^2$ and —$SO_2$—$R^2$ wherein $R^2$ is a member selected from the group consisting of lower alkyl, e.g., methyl, ethyl, propyl, isopropyl, butyl, hexyl, etc., 2-amino-2-carboxy-lower alkyl, e.g., 2-amino-2-carboxyethyl, halo-lower alkyl, e.g., 3-chloropropyl, 3,3,3-trifluoropropyl, etc., alkoxycarbonyl-lower alkyl, e.g.,methoxycarbonylmethyl (i.e., $CH_3OCOCH_2$—), ethoxycarbonylmethyl, etc., carboxy-lower alkyl, e.g., carboxymethyl (i.e.,

—$CH_2COOH$)

etc., cycloalkyl, e.g., cyclopentyl, cyclohexyl, etc., cycloalkylalkyl, e.g., cyclopentylmethyl, cyclohexylmethyl, etc., phenyl, substituted phenyl, e.g.,

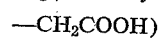

wherein $X^2$ is a member selected from the group consisting of halogen, lower alkyl, trifluoromethyl, lower alkoxy, carboxy and lower alkylsulfonyl, e.g., mesyl, etc., phenyl-lower alkyl wherein lower alkyl represents a lower alkylene chain of 1-5 carbon atoms, e.g., benzyl phenylethyl, etc., nuclear substituted phenyl-lower alkyl, e.g.,

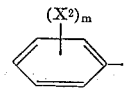

wherein $X^2$ is as defined above,

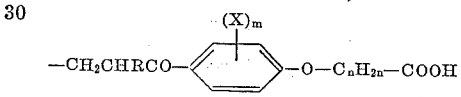

wherein R and X are as defined above, and —$C_nH_{2n}$—Z wherein Z is as defined above, m, in each occurrence, is an integer having a value of 1–4 and n, in each occurrence, is an integer having a value of 1–5.

The conversion of the [4-[2-(organosulfinylmethyl)alkanoyl]phenoxy]alkanoic acid or [4-[2-(organosulfonylmethyl)alkanoyl]phenoxy]alkanoic acid reactant (A) to the corresponding [4-(2-methylenealkanoyl)phenoxy]alkanoic acid reactant (B) is effected by treating the said reactant with a weak base. In general, any reagent which is capable of producing a weakly basic reaction medium may be employed with good results; however, it is advisable to select a base that will inhibit secondary reactions involving the reactants or products of the process and thereby reduce the formation of undesired side products. One reagent which we have found to be particularly suitable for this purpose and which produces the desired [4-(2-methylenealkanoyl)phenoxy]alkanoic acids in good yield is aqueous sodium bicarbonate. It will be apparent to one skilled in the art that strongly basic conditions are to be avoided. It has also been found that the reaction proceeds most advantageously by heating the reactants as, for example, by heating at a temperature slightly above room temperature. However, the application of heat is not necessary to the success of the process but serves simply to increase the rate of the reaction and thus promote the conversion of the sulfinyl and sulfonyl reactants to their corresponding methylene substituted products.

I have found that the process proceeds most readily in aqueous solution but it will be apparent to one skilled in the art that certain other solvents in which the reactants are reasonably soluble may also be employed with similar results. In general, the basic reagent is added to a solution comprising the [4-[2-(organosulfinylmethyl)alkanoyl]phenoxy]alkanoic acid or [4-[2-(organosulfonylmethyl)alkanoyl]phenoxy]alkanoic acid and solvent, and the mixture is heated for such period of time as is necessary for completion of the reaction. The reaction mixture is then cooled and acidified to separate the desired [4 - (2 - methylenealkanoyl)phenoxy]alkanoic acid from the reaction mass. The products of the instant process are solids and, if desired, may be purified by recrystallization from a suitable solvent. Suitable solvents include, for example, methylcyclohexane, carbon tetrachloride, benzene and a mixture of benzene with other hydrocarbons.

I have also found that the [4-(2-methylenealkanoyl)phenoxy]alkanoic acid products are advantageously prepared in good yield by adding a salt of a heavy metal to the reaction mixture comprising the [4-[2-(organosulfinylmethyl)alkanoyl]phenoxy]alkanoic acid or [4-[2-(organosulfonylmethyl)alkanoyl]phenoxy]alkanoic acid described above. Suitable heavy metal salts which I have found to be most effective include certain salts of silver, lead and mercury, such as silver nitrate, lead acetate, etc.

A preferred embodiment of the invention comprises the treatment of a [4-[2-(organosulfinylmethyl)alkanoyl]phenoxy]acetic acid or [4-[2-(organosulfonylmethyl)alkanoyl]phenoxy]acetic acid, depicted below as reactant A, in aqueous media with a weak base to produce the desired [4 - (2 - methylenealkanoyl)phenoxy]acetic acid. The following equation illustrates the process:

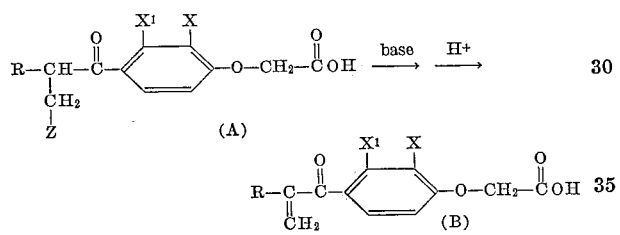

(A)

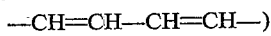

(B)

where R is a member selected from the group consisting of lower alkyl and trihalomethyl-lower alkyl, X and $X^1$ each represents a member selected from the group consisting of hydrogen, halogen and methyl and, taken together, the X and $X^1$ radicals can be combined to form a 1,3-butadienylene chain (i.e.,

—CH=CH—CH=CH—)

and Z is a member selected from the group consisting of —SO—$R^2$ and —$SO_2$—$R^2$ wherein $R^2$ represents lower alkyl. The base employed in the process may be any one of the basic reagents discussed supra; for example, sodium bicarbonate.

This invention also relates to the preparation of salts of the instant [4-(2-methylenealkanoyl)phenoxy]alkanoic acids, which salts are prepared by the reaction of the said acids with a base having a non-toxic pharmacologically acceptable cation. In general, any base which will form a salt with a carboxylic acid and whose pharmacological properties will not cause an adverse physiological effect when ingested by the body system is considered as being within the scope of this invention; suitable bases thus include, for example, the alkali metal and alkaline earth metal hydroxides, carbonates, etc., ammonia, primary, secondary and tertiary amines, such as monoalkylamines, dialkylamines, trialkylamines, nitrogen containing heterocyclic amines, e.g., piperidine, etc. The acid addition salts thus produced are the functional equivalent of their corresponding phenoxyacetic acids and one skilled in the art will appreciate that to the extent that the phenoxyalkanoic acids of the invention are useful in therapy, the variety of acid addition salts embraced by this invention are limited only by the criterion that the bases employed in forming the salts be both nontoxic and physiologically acceptable.

The [4 - [2 - (organosulfinylmethyl)alkanoyl]phenoxy]alkanoic acids and [4-[2-(organosulfonylmethyl)alkanoyl]phenoxy]alkanoic acids employed as reactants in the process, are prepared by the reaction of a [4-[2-(disubstituted-aminomethyl)alkanoyl]phenoxy]alkanoic acid with a mercaptan, or hydrogen sulfide, or the salts of a mercaptan or hydrogen sulfide, in the presence of sodium bicarbonate and oxidizing the [4-[2-(organomercaptomethyl)alkanoyl]phenoxy]alkanoic acid thus formed with a suitable oxidizing agent. Essentially the oxidation reaction proceeds in stages, the first of which produces the sulfoxide compound and the second of which yields the corresponding sulfone product. The following equation illustrates the process:

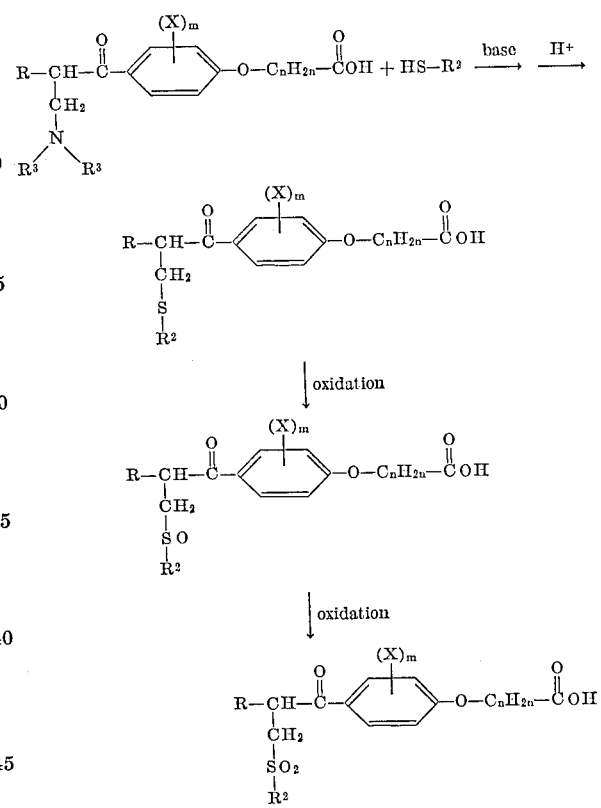

wherein R, $R^2$, X, $m$ and $n$ are as defined above, and $R^3$ represents a member selected from the group consisting of lower alkyl, e.g., methyl, ethyl, etc., and, together with the nitrogen atom to which they are attached, an heterocyclic radical, e.g., piperidino. In general, any oxidizing agent capable of converting a sulfide to its sulfoxide and sulfone analogs may be employed in the oxidation of the [4 - [2 - (organomercaptomethyl)alkanoyl]phenoxy] alkanoic acid reactant to its organosulfinyl and organosulfonyl counterparts. One such oxidizing agent which produces the sulfoxide and the sulfone derivatives in good yield and which we have found to be particularly suitable in the oxidation process is hydrogen peroxide; we have also found, however, that the molar ratio of hydrogen peroxide to sulfide in solution must be carefully controlled. For example, by employing a substantially equal molar amount of hydrogen peroxide and sulfide reactant the product produced is predominantly the sulfoxide derivative. Conversely, by employing a molar ratio of at least two moles of hydrogen peroxide per mole of sulfide reactant the compound produced is the corresponding sulfone derivative.

If a dithiol reactant of the type HS—Y—SH is substituted for the mercaptan or hydrogen sulfide reactant of the process described in the preceding paragraph and two moles of the [4-[2-(disubstituted-aminomethyl)alkanoyl]phenoxy]alkanoic acid reactant are employed, a sulfide of the type depicted below is obtained:

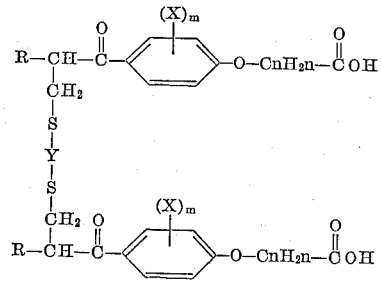

wherein Y represents an alkylene moiety of the formula —$C_nH_{2n}$— and the radicals R, X, m and n are as defined above.

When hydrogen sulfide or sodium hydrosulfide (i.e., NaHS) is substituted for the mercaptan, $R^2SH$, in the process described above for preparing the sulfide reactants and two moles of [4-[2-(disubstituted-aminomethyl)alkanoyl]phenoxy]alkanoic acid are employed, a sulfide of the following type is obtained:

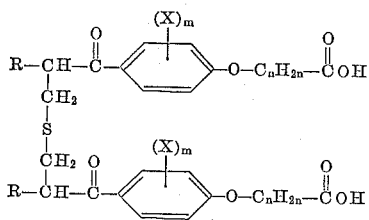

wherein R, X, m and n are as defined above.

These and other methods for preparing the organosulfinyl and organosulfonyl reactants (A) of the instant process are described in my copending application, Ser. No. 317,086, filed Oct. 17, 1963.

The following examples are illustrative of the method by which the [4-(2-methylenealkanoyl)phenoxy]alkanoic acids of the invention may be prepared. The examples are illustrative only and the invention should not be construed as being limited thereto.

EXAMPLE 1

[2,3-dichloro-4-(2-methylenebutyryl)phenoxy]acetic acid

STEP A.—2,3-DICHLOROANISOLE

A five-liter, four-necked round-bottomed flask is equipped with a stirrer, reflux condenser and two dropping funnels, 2,3-dichlorophenol (400 g., 2.45 mole) is placed in the flask and methanol (400 ml.) and 10 N sodium hydroxide (245 ml., 2.45 mole) are added. The temperature rises to 55° C. The mixture is heated to 80–85° C. on a steam bath and 10 N sodium hydroxide (615 ml., 6.15 mole) is placed in one dropping funnel and dimethyl sulfate (816 ml., 1090 g., 8.6 mole) in the other. The base and dimethyl sulfate are then added simultaneously in a dropwise manner over 3½ hours with stirring. Heating and stirring then is continued for 1 hour. The mixture then is cooled and water (600 ml.) is added. The oil that separates soon solidifies. The solid is collected by filtration and dissolved in ether (500 ml.). The filtrate is exacted with ether (400 ml.) and the two ether solutions are combined and dried over anhydrous sodium sulfate. The ether is evaporated and the residue is dried in a vacuum desiccator over phosphorous pentoxide. The yield is 428 g. (98%) of 2,3-dichloroanisole, M.P. 32–33° C.

STEP B.—2,3-DICHLORO-4-BUTYRYLPHENOL

Butyryl chloride (128.0 g., 1.2 mole), 2,3-dichloroanisole (197.7 g., 1.11 mole), prepared as described in Step A, and carbon disulfide (400 ml.) are placed in a four-necked flask fitted with a a mechanical stirrer, thermometer, reflux condenser (protected by a calcium chloride tube) and a Gooch sleeve bearing a 250 ml. Erlenmeyer flask containing anhydrous aluminum chloride (160 g., 1.2 mole). While the reaction mixture is cooled in an ice bath, the aluminum chloride is added in small portions with stirring at such a rate that the temperature of the reaction mixture does not exceed 20–25° C. The ice bath is removed and the mixture is stirred at room temperature for 1 hour, then in a water bath at 55° C. for 45 minutes, and then kept at room temperature overnight.

n-Heptane (400 ml.) and aluminum chloride (160 g., 1.2 mole) then are added. The condenser is set for distillation, the mixture is stirred and heated in a water bath heated by means of a steam bath and the carbon disulfide is distilled off. A second portion of n-heptane (400 ml.) is added, the condenser is set for reflux, the reaction mixture is stirred and heated in a bath at 80° C. for 3 hours and then allowed to cool. The heptane is decanted and the residue hydrolyzed by the slow addition of a solution of concentrated hydrochloric acid (120 ml.) in water (1500 ml.). The brown solid that separates is collected by suction filtration, washed well with water and dissolved in ether. The ether solution is extracted twice with a total of two liters of 5% sodium hydroxide. The sodium hydroxide extract is stirred with decolorizing carbon (Norit) (2–3 teaspoons) and filtered by suction through a pad of diatomaceous earth (Super-Cel). Upon acidification, a light brown solid separates. This is collected by filtration, washed with water and dried at 100° C. for 3 hours.

The dried solid is dissolved in hot benzene (1 liter) and the insoluble matter is removed by filtration. Upon cooling, a slightly colored solid separates. This is dissolved in hot benzene (750 ml.), the solution is allowed to cool to room temperature and then chilled to 10° C. in a refrigerator. The product (203 g., 85%); M.P. 109–110.5° C., is collected by filtration. The product is taken up in 1500 ml. of hot benzene, treated with decolorizing carbon (Norit) and filtered. Upon cooling, a white solid identified as 2,3-dichloro-4-butyrylphenol (180 g., 75%), M.P. 109–110° C., separates.

Analysis for $C_{10}H_{10}Cl_2O_2$.—Calculated: C, 51.52; H, 4.32; Cl, 30.42. Found: C, 51.70; H, 4.24; Cl, 30.32.

STEP C.—ETHYL (2,3-DICHLORO-4-BUTYRYLPHENOXY) ACETATE

Dry 1,2-dimethoxyethane (100 ml.) is placed in a 1-liter, 4-necked, round-bottomed flask equipped with a stirrer, reflux condenser (protected by a calcium chloride tube) and a dropping funnel. Sodium hydride (10.3 g. of a 53% solution in mineral oil, 0.215 mole) is added, the stirrer started and a solution of 4-butyryl-2,3-dichlorophenol (50 g., 0.215 mole) in dry 1,2-dimethoxyethane (150 ml.) is added, dropwise, over a period of 30 minutes. After the evolution of gas has ceased, ethyl bromoacetate (35.9 g., 0.215 mole) is introduced, dropwise, over 30 minutes.

The mixture is stirred and heated on a steam bath for 3.5 hours. The major portion of the 1,2-dimethoxyethane is removed by distillation, then ether (400 ml.) and sufficient water to dissolve the precipitated sodium bromide are added. The ether layer is separated, washed with water and dried over anhydrous sodium sulfate. The ether is removed by distillation and the residue is distilled in vacuo. The portion boiling at 180–195° C. at 0.5 mm. mercury pressure is collected. Upon standing, the distillate crystallizes to a white solid, M.P. 53–54° C. The yield is 64 g. (95%). Recrystallization from a 1:5 mixture of benzene and cyclohexane gives ethyl(2,3-dichloro-4-butyrylphenoxy)acetate melting at 55–56° C.

Analysis for $C_{14}H_{16}Cl_2O_4$.—Calculated: C, 52.68; H, 5.05; Cl, 22.22. Found: C, 52.79; H, 5.03; Cl, 22.07.

STEP D.—(2,3-DICHLORO-4-BUTYRYLPHENOXY) ACETIC ACID

Ethyl (2,3-dichloro-4-butyrylphenoxy)acetate (30 g., 0.095 mole) is dissolved in methanol (100 ml.) and is treated with a solution of 85% potassium hydroxide (13.2 g., 0.2 mole) in methanol (100 ml.). The mixture is stirred for an hour and then the methanol is removed by distillation at reduced pressure. The residue is dissolved in hot water and the solution cooled and acidified with hydrochloric acid. The solid that separates is (2,3-dichloro-4-butyrylphenoxy)acetic acid. The yield is 26 g. (95%) of material which, after recrystallization from a 1:3.6 mixture of benzene and cyclohexane, melts at 110.5–111.5° C. (A dimorphic form melting at 100–101° C. is sometimes isolated.)

Analysis for $C_{12}H_{12}Cl_2O_4$.—Calculated: C, 49.51; H, 4.15; Cl, 24.36. Found: C, 49.81; H, 4.22; Cl, 24.40.

STEP E.—[2,3-DICHLORO-4-[2-(DIMETHYLAMINOMETHYL)BUTYRYL]PHENOXY]ACETIC ACID HYDROCHLORIDE

In a 100 ml. round flask equipped with an outlet tube suitable for connecting to a water aspirator is placed an intimate mixture of (2,3-dichloro-4-butyrylphenoxy)acetic acid (5.20 g., 0.0179 mole), paraformaldehyde (0.63 g., 0.072 mole), dry dimethylamine hydrochloride (1.59 g., 0.0195 mole) and 4 drops acetic acid. The mixture is heated on the steam bath for about 1.5 hours and during this period the internal pressure of the vessel is reduced to about 15 mm. mercury for a period of 1 minute at 15-minute intervals. Upon cooling, a solid is obtained which is triturated with ether to give 5.8 g. (85%) of [2,3-dichloro-4 - [2 - (dimethylaminomethyl)butyryl]phenoxy]acetic acid hydrochloride in the form of a white solid. After two recrystallizations carried out by dissolving the solid in hot methanol and gradually adding ether, the product melts at 165–167° C.

Analysis for $C_{15}H_{20}OCl_3NO_4$.—Calculated: C, 46.83; H, 5.24; Cl, 27.65; N, 3.64. Found: C, 46.69; H, 5.31; Cl. 27.59; N, 3.53.

STEP F.—[2,3-DICHLORO-4-[2-METHYLMERCAPTOMETHYL)BUTYRYL]PHENOXY]ACETIC ACID

[2,3-dichloro-4-[2-(dimethylaminomethyl)butyryl]phenoxy]acetic acid hydrochloride (3.76 g., 0.015 mole) is dissolved in a solution containing sodium bicarbonate (2.52 g., 0.03 mole) and water (150 ml.). The solution is stirred and a stream of gaseous methyl mercaptan is admitted below the surface of the solution for 15 minutes. The addition of methyl mercaptan is continued while the stirred solution is heated on a steam bath for 1½ hours.

After cooling the reaction mixture to room temperature it is made acid to Congo-red test paper by the addition of 6 N hydrochloric acid. The resulting gum is extracted with ether and the combined extracts are dried over anhydrous magnesium sulfate. The ether is evaporated under reduced pressure to give a white solid, M.P. 82–86° C. Recrystallization from a mixture of benzene and cyclohexane gives 15.0 g. (86%) of [2,3-dichloro-4-[2-(methylmercaptomethyl)butyryl]phenoxy]acetic acid in the form of white prisms, M.P. 86–89° C.

Analysis for $C_{14}H_{16}Cl_2O_4S$.—Calculated: C, 47.87; H, 4.59; S, 9.13. Found: C, 48.13; H, 4.56; S, 9.07.

STEP G.—[2,3-DICHLORO-4-[2-(METHYLSULFINYLMETHYL)BUTYRYL]PHENOXY]ACETIC ACID

[2,3-dichloro-4 - [2 - (methylmercaptomethyl)butyryl]phenoxy]acetic acid (6.22 g., 0.01772 mole) is dissolved in 25 ml. of acetic acid and treated, dropwise, with a solution of 33.2% hydrogen peroxide (1.91 g.; 0.01861 mole) in acetic acid (5 ml.). The colorless solution is allowed to stand at room temperature.

After 17 hours, the reaction solution is concentrated to dryness under reduced pressure. The viscous residue is dissolved in ethyl acetate (10 ml.) and treated with butyl chloride (10 ml.) to give 4.90 g. of a white solid identified as [2,3-dichloro-4-[2-(methylsulfinylmethyl)butyryl]phenoxy]acetic acid (75%). The product is purified by three recrystallizations from a mixture of acetonitrile and butyl chloride and has a melting point of 123.5–124.5° C.

Analysis for $C_{14}H_{16}Cl_2O_5S$.—Calculated: C, 45.79; H, 4.39; S, 8.73; Cl, 19.31. Found: C, 45.93; H, 4.46; S, 8.52; Cl, 19.38.

STEP H.—[2,3-DICHLORO-4-(2-METHYLENEBUTYRYL)PHENOXY]ACETIC ACID

[2,3-dichloro-4-[2 - (methylsulfinylmethyl)butyryl]phenoxy]acetic acid (0.20 g.) is suspended in water (5 ml.) and dissolved by adding a saturated aqueous sodium bicarbonate solution and the resulting mixture heated on a steam bath for one hour. The reaction solution is cooled and made acid to Congo-red test paper by the addition of 6 N hydrochloric acid. The resulting semi-solid is extracted with ether and the ether extract dried over anhydrous magnesium sulfate. Removal of the ether under reduced pressure gives a solid. Recrystallization of the solid from methylcyclohexane gives a white crystalline product identified as [2,3-dichloro-4-(2-methylenebutyryl)phenoxy]acetic acid, M.P. 124.5–125.5° C.

Analysis for $C_{13}H_{12}Cl_2O_4$.—Calculated: C, 51.51; H, 3.99; Cl, 23.39. Found: C, 51.23; H, 4.18; Cl, 23.49.

EXAMPLE 2

*[2,3-dichloro-4-(2-methylenebutyryl)phenoxy]acetic acid*

STEP A.—[2,3-DICHLORO-4-[2-(MESYLMETHYL)BUTYRYL]PHENOXY]ACETIC ACID

To a solution of [2,3-dichloro-4-[2-(methylmercaptomethyl)butyryl]phenoxy]acetate acid (5.97 g., 0.017 mole), prepared by the process described in Steps A through F of Example 1, in acetic acid (30 ml.), is added a 33.2% aqueous solution of hydrogen peroxide (5.23 g., 0.051 mole) dropwise, with cooling. The resulting colorless solution is allowed to stand at room temperature.

After 66 hours, the reaction solution is slowly treated with water (250 ml.) until precipitation is complete. The resulting white solid is collected, washed with water and dried to give 5.46 g. (84%) of [2,3-dichloro-4-[2-(mesylmethyl)butyryl]phenoxy]acetic acid, M.P. 137–140° C. Recrystallization from isopropyl alcohol gives 5.34 g. of product in the form of white prisms, M.P. 139.5–140.5° C.

Analysis for $C_{14}H_{16}Cl_2O_6S$.—Calculated: C, 43.87; H, 4.21; S, 8.37. Found: C, 43.68; H, 4.21; S, 8.49.

STEP B.—[2,3-DICHLORO-4-(2-METHYLENEBUTYRYL)PHENOXY]ACETIC ACID

By substituting an equimolar amount of [2,3-dichloro-4-[2-(mesylmethyl)butyryl]phenoxy]acetic acid for the [2,3-dichloro-4 - [2 - (methylsulfinylmethyl)butyryl]phenoxy]acetic acid employed in Step H of Example 1, and following substantially the procedure described therein, the compound [2,3-dichloro-4-(2-methylenebutyryl)phenoxy]acetic acid is prepared, M.P. 124.5–125.5° C.

Analysis for $C_{12}H_{12}Cl_2O_4$.—Calculated: C, 49.51; H, 4.15; Cl, 24.36. Found: C, 49.81; H, 4.22; Cl, 24.40.

By following substantially the procedures described in Example 1 and Example 2 respectively, the organosulfinyl and organosulfonyl reactants set forth in Table I below are converted to their corresponding [4-(2-methylenealkanoyl)phenoxy]acetic acids. The process is illustrated by the following equation, wherein the $x$ radical represents an integer having a value of 1–2:

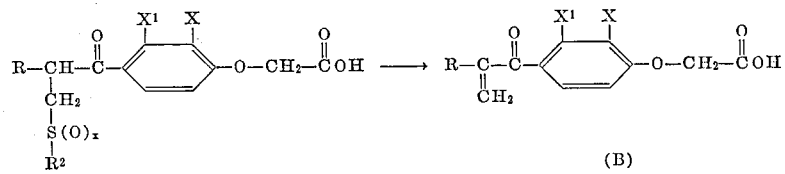

(B)

TABLE I

| Ex. | R | R² | X | X¹ | Melting Point of Product B, °C. |
|---|---|---|---|---|---|
| 3 | $-C_2H_5$ | $-CH(CH_3)-CH_3$ | H | Cl | 109–111 |
| 4 | $-C_2H_5$ | $-CH_2-CH_3$ | H | Cl | 109–111 |
| 5 | $-C_2H_5$ | $-C_6H_4-COOH$ (phenyl-COOH) | H | Cl | 109–111 |
| 6 | $-C_2H_5$ | $-CH_2-CH(NH_2)-COOH$ | H | Cl | 109–111 |
| 7 | $-C_2H_5$ | $-CH_2-CH(NH_2)-COOH$ | $CH_3$ | $CH_3$ | 83.5–84.5 |
| 8 | $-C_2H_5$ | $-CH_2-CHCl_2$ | H | Cl | 109–111 |
| 9 | $-C_2H_5$ | $-CH_2-CH_2-CH_3$ | H | Cl | 109–111 |
| 10 | $-C_2H_5$ | $-CH_2-CH=CH_2$ | H | Cl | 109–111 |
| 11 | $-C_2H_5$ | $-C(CH_3)_3$ | H | Cl | 109–111 |
| 12 | $-C_2H_5$ | cyclopentyl-CH- | H | Cl | 109–111 |
| 13 | $-C_2H_5$ | $-CH_2$-phenyl | H | Cl | 109–111 |
| 14 | $-C_2H_5$ | phenyl | H | Cl | 109–111 |
| 15 | $-C_2H_5$ | $-CH_2-CH(NH_2)-C(O)OH$ | Cl | Cl | 124.5–125.5 |
| 16 | $-C_2H_5$ | $-C(CH_3)_3$ | Cl | Cl | 124.5–125.5 |
| 17 | $-C_2H_5$ | $-CH_2-CH=CH_2$ | Cl | Cl | 124.5–125.5 |
| 18 | $-C_2H_5$ | $-CH_2$-phenyl | Cl | Cl | 124.5–125.5 |
| 19 | $-C_2H_5$ | cyclohexyl-CH- | Cl | Cl | 124.5–125.5 |
| 20 | $-CH_3$ | $-CH_2-COOH$ | H | Cl | 129–130 |
| 21 | $-C_2H_5$ | $-CH_2-CH_2-CH_3$ | H | Cl | 109–111 |
| 22 | $-C_2H_5$ | $-CH_2-COOH$ | H | Cl | 109–111 |
| 23 | $-C_2H_5$ | $-CH_2-CH_2-COOH$ | H | Cl | 109–111 |
| 24 | $-C_2H_5$ | $-CH_2-CH(NHCOCH_3)-COOH$ | Cl | Cl | 124.5–125.5 |
| 25 | $-C_2H_5$ | $-CH_3$ | H | Cl | 109–111 |
| 26 | $-C_2H_5$ | $-CH_2-CH(NHCOCH_3)-COOH$ | H | Cl | 109–111 |
| 27 | $-C_2H_5$ | $-CH_2-COOH$ | Cl | Cl | 124.5–125.5 |
| 28 | $-C_2H_5$ | $-(CH_2)_2-CH(NH_2)-COOH$ | Cl | Cl | 124.5–125.5 |
| 29 | $-C_2H_5$ | $-C_6H_4-COOH$ (phenyl-COOH) | Cl | Cl | 124.5–125.5 |
| 30 | $-C_2H_5$ | $-CH_2-CH_2-CH_2Cl$ | Cl | Cl | 124.5–125.5 |
| 31 | $-C_2H_5$ | $-CH_3$ | $CH_3$ | $CH_3$ | 83.5–84.5 |
| 32 | $-CH_2CF_3$ | $-CH_3$ | $CH_3$ | $CH_3$ | 82–84 |
| 33 | $-C_2H_5$ | $-CH_3$ | Cl | $CH_3$ | 89–91 |
| 34 | $-C_2H_5$ | $-CH_3$ | $CH_3$ | Cl | 113–114 |
| 35 | $-C_2H_5$ | $-CH_3$ | $-CH=CH-CH=CH-$ | | 106–109 |

TABLE I—Continued

| Ex. | R | R² | X | X¹ | Melting Point of Product B, °C. |
|---|---|---|---|---|---|
| 36 [1] | —C₂H₅ | —CH₂—CH₂—)₂ | H | Cl | 109–111 |
| 37 [2] | —C₂H₅ | 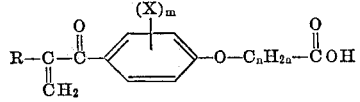 | H | Cl | 109–111 |
| 38 [2] | —C₂H₅ | 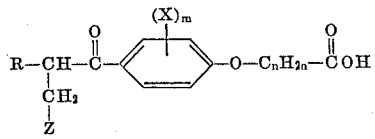 | Cl | Cl | 124.5–125.5 |

[1] Prepared from 1,4-butanedithiol.
[2] Prepared from hydrogen sulfide.

Each of the organosulfinyl and organosulfonyl substituted phenoxyacetic acid reactants set forth in Table I is prepared by the oxidation of its corresponding organomercapto precursor as disclosed in our copending application Ser. No. 317,086, filed Oct. 17, 1963.

The [4-(2-methylenealkanoyl)phenoxy]alkanoic acids prepared by the process of the invention are highly useful diuretic and saluretic agents. Because of this property they are useful in therapy for the treatment of conditions resulting from an excessively high concentration of electrolyte in the body or an excessively high retention of fluid in the body such as in the treatment of edematous conditions resulting, for example, from congestive heart failure.

What is claimed is:

1. A process for preparing a compound of the formula

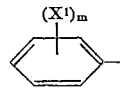

which comprises the treatment of a compound of the formula

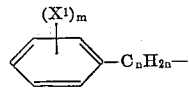

with sodium bicarbonate, followed by acidification, where R is a member selected from the group consisting of lower alkyl, halo-lower alkyl, cycloalkyl,

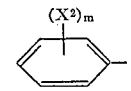

wherein X¹ is a member selected from the group consisting of hydrogen, halogen, lower alkyl, lower alkoxy, carboxy and lower alkylsulfonyl, and

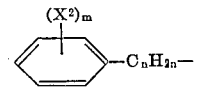

wherein X¹ is as defined above, X is a member selected from the group consisting of hydrogen, halogen, trifluoromethyl, lower alkyl, nitro and lower alkoxy and, when substituted on adjacent carbon atoms of the benzene ring, two X radicals are combined to form a 1,3-butadienylene chain, Z is a member selected from the group consisting of —SO—R² and —SO₂—R² wherein R² is a member selected from the group consisting of lower alkyl, 2-amino-2-carboxy-lower alkyl, halo-lower alkyl, alkoxy-carbonyl-lower alkyl, carboxy-lower alkyl, cycloalkyl, cycloalkylalkyl,

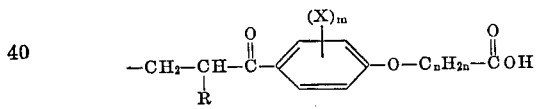

wherein X² is a member selected from the group consisting of hydrogen, halogen, lower alkyl, trifluoromethyl, lower alkoxy, carboxy and lower alkylsulfonyl,

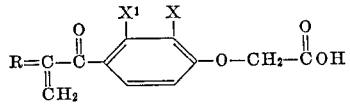

wherein X² is as defined above,

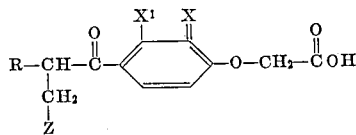

wherein R and X are as defined above and —CₙH₂ₙ—Z wherein Z is as defined above, m, in each occurrence, is an integer having a value of 1–4 and n, in each occurrence, is an integer having a value of 1–5.

2. A process for preparing a compound of the formula

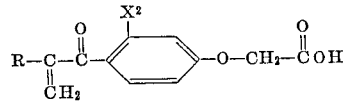

which comprises the treatment of a compound of the formula $$R-CH-\overset{\overset{O}{\|}}{C}\underset{X^1\ X}{\bigcirc}-O-CH_2-\overset{\overset{O}{\|}}{C}OH$$
$$\underset{Z}{\overset{|}{CH_2}}$$

with sodium bicarbonate, followed by acidification, where R is a member selected from the group consisting of lower alkyl and trihalomethyl-lower alkyl, X and X¹ each represent a member selected from the group consisting of hydrogen, halogen, methyl and, taken together, the X and X¹ radicals are combined to form a 1,3-butadieneylene chain and Z is a member selected from the group consisting of —SO—R² and —SO₂—R² wherein R² represents lower alkyl.

3. A process for preparing a compound of the formula $$R-\overset{\overset{O}{\|}}{C}-\overset{X^2}{\underset{}{\bigcirc}}-O-CH_2-\overset{\overset{O}{\|}}{C}OH$$
$$\overset{|}{CH_2}$$

which comprises the treatment of a compound of the formula

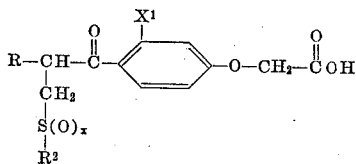

with sodium bicarbonate, followed by acidification, wherein R and $R^2$ represent lower alkyl, $X^1$ represents halogen and $x$ is an integer having a value of 1-2.

4. A process for preparing a compound of the formula

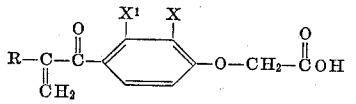

which comprises the treatment of a compound of the formula

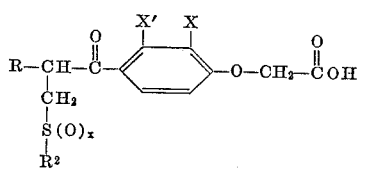

with sodium bicarbonate, followed by acidification, wherein R and $R^2$ represents lower alkyl, X and $X^1$ represents halogen and $x$ is an integer having a value of 1-2.

5. A process for preparing a compound of the formula

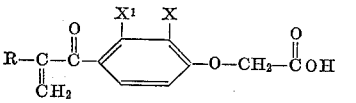

which comprises the treatment of a compound of the formula

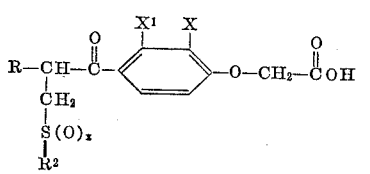

with soidum bicarbonate, followed by acidification, wherein R, $R^2$, X and $X^1$ represent lower alkyl and $x$ is an integer having a value of 1-2.

6. A process for preparing a compound of the formula

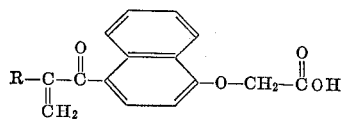

which comprises the treatment of a compound of the formula

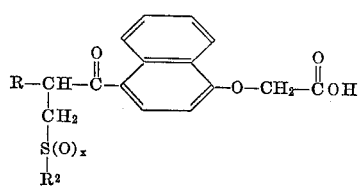

with sodium bicarbonate, followed by acidification, wherein R and $R^2$ represent lower alkyl and $x$ is an integer having a value of 1-2.

7. A process for preparing a compound of the formula

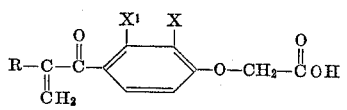

which comprises the treatment of a compound of the formula

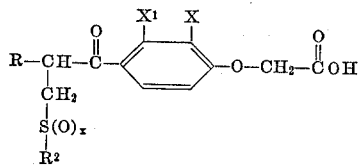

with sodium bicarbonate, followed by acidification, wherein R, $R^2$ and $X^1$ represent lower alkyl, X represents halogen and $x$ is an integer having a value of 1-2.

8. A process for preparing a compound of the formula

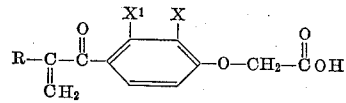

which comprises the treatment of a compound of the formula

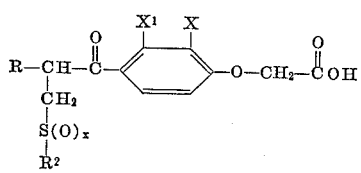

with sodium bicarbonate, followed by acidification, wherein R, $R^2$ and X represent lower alkyl, $X^1$ represents halogen and $x$ is an integer having a value of 1-2.

9. A process for preparing a compound of the formula

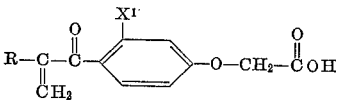

which comprises the treatment of a compound of the formula

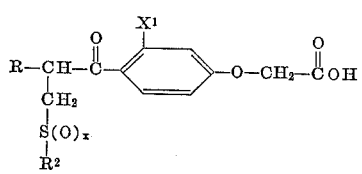

with sodium bicarbonate, followed by acidification, wherein R, $R^2$ and $X^1$ represent lower alkyl and $x$ is an integer having a value of 1-2.

10. A process for preparing [2,3-dichloro-4-(2-methylenebutyryl)phenoxy]acetic acid which comprises the treatment of [2,3-dichloro-4 - [2 - (methylsulfinylmethyl) butyryl]phenoxy] acetic acid with sodium bicarbonate, followed by acidification.

11. A process for preparing [2,3-dichloro-4-(2-methylenebutyryl)phenoxy]acetic acid which comprises the treatment of [2,3-dichloro-4 - [2 - (mesylmethyl)butyryl] phenoxy]acetic acid with sodium bicarbonate, followed by acidification.

12. A process for preparing [3-chloro-4-(2-methylenebutyryl)phenoxy]acetic acid which comprises the treatment of [3-chloro-4 - [2 - (methylsulfinylmethyl)butyryl] phenoxy]acetic acid with sodium bicarbonate, followed by acidification.

13. A process for preparing [3-chloro-4-(2-methylenebutyryl)phenoxy]acetic acid which comprises the treatment of [3-chloro-4-[2-methylsulfonylmethyl)butyryl] phenoxy]acetic acid with a weak base, followed by acidification.

14. A proces for preparing [2,3-dimethyl-4-(2-methylene-4,4,4-trifluorobutyryl)phenoxy]acetic acid which comprises the treatment of [2,3-dimethyl-4-[2-(methylsulfinylmethyl)-4,4,4-trifluorobutyryl]phenoxy]acetic acid with sodium bicarbonate, followed by acidification.

15. A process for preparing [2,3-dimethyl-4-(2-methylene - 4,4,4 - trifluorobutyryl)phenoxy]acetic acid which comprises the treatment of [2,3-dimethyl-4-[2-(methylsulfonylmethyl) - 4,4,4 - trifluorobutyryl]phenoxy]acetic acid with sodium bicarbonate, followed by acidification.

16. A process for preparing [4-(2-methylenebutyryl)-1-naphthyloxy]acetic acid which comprises the treatment of [4-[2-(methylsulfinylmethyl)butyryl]-1 - naphthyloxy] acetic acid with sodium bicarbonate, followed by acidification.

17. A process for preparing [4-(2-methylenebutyryl)-1-naphthyloxy]acetic acid which comprises the reaction of [4-[2-(methylsulfonylmethyl)butyryl] - 1 - naphthyloxy] acetic acid with sodium bicarbonate, followed by acidification.

18. A process for preparing [2-chloro-3-methyl-4-(2-methylenebutyryl)phenoxy]acetic acid which comprises the treatment of [2-chloro-3-methyl-4-[2-(methylsulfinylmethyl)butyryl]phenoxy]acetic acid with sodium bicarbonate, followed by acidification.

19. A process for preparing [2-chloro-3-methyl-4-(2-methylenebutyryl)phenoxy]acetic acid which comprises the treatment of [2-chloro-3-methyl-4[2(methylsulfonylmethyl)butyryl]phenoxy]acetic acid with sodium bicarbonate, followed by acidification.

20. A process for preparing [2-methyl-3-chloro-4-(2-methylenebutyryl)phenoxy]acetic acid which comprises the treatment of [2-methyl-3-chloro-4-[2-(methylsulfinylmethyl)butyryl]phenoxy]acetic acid with sodium bicarbonate, followed by acidification.

References Cited

Gould, "Mechanism and Structure in Organic Chemistry," 1959, pp. 480–483.

LORRAINE A. WEINBERGER, *Primary Examiner.*

SIDNEY B. WILLIAMS, *Assistant Examiner.*